Patented Feb. 15, 1944

2,341,792

UNITED STATES PATENT OFFICE 2,341,792

CATALYTIC TREATMENT OF HYDROCARBONS

Elmer R. Kanhofer, Chicago, Ill., assignor to Universal Oil Products Company, Chicago, Ill., a corporation of Delaware No Drawing. Application April 14, 1941,
Serial No. 388,463

17 Claims. (Cl. 196—53)

This invention relates to a process for the conversion and refining of hydrocarbons such as petroleum fractions and hydrocarbon oils generally in the presence of finely divided catalysts to produce hydrocarbons distilling within the gasoline boiling range and having high antiknock value. The process may be applied to conversion and refining treatments involving lower boiling as well as higher boiling hydrocarbons whether they are of natural or synthetic origin, or are produced as for example from primary distillates resulting from the destructive distillation of hydrocarbon containing materials such as coals, lignites and shales.

The present invention provides a process for converting and refining hydrocarbon oil in a relatively simple manner while in the presence of finely divided catalyst. In the conventional catalytic processes hydrocarbon oils are converted while in contact with granular catalysts disposed as beds in reaction chambers which are periodically regenerated. A plurality of reaction chambers are generally provided so as to permit continuous operation, one or more chambers for contacting the hydrocarbons with the catalyst while one or more chambers are in process of catalyst regeneration. When hydrocracking, hydro-reforming, or hydro-refining in the presence of the finely divided catalyst of the present invention, the process is not restricted by methods of alternately processing and regenerating in the reaction zone since the catalyst may be regenerated outside the reaction zone. The invention is further characterized by the use of catalysts specially adapted to the process. These catalysts are produced synthetically and in a finely divided condition. They are more effective than synthetic catalysts of similar composition which may be prepared in a gel condition, and subsequently dried and reduced to a powdered form.

In one specific embodiment the present invention comprises commingling a hydrocarbon oil and hydrogen with a synthetic catalyst powder comprising a mixture of catalyst material containing cracking and hydrogenating catalyst components which have been precipitated in a finely divided condition, and subjecting the commingled catalyst, oil and hydrogen to conditions of time, temperature and pressure adequate to produce a relatively saturated gasoline having high antiknock value, subsequently separating spent catalyst from the reaction products, regenerating the catalyst and returning regenerated catalyst to the process, and fractionating the vaporous products to separate said high antiknock gasoline.

In a further embodiment high boiling hydrocarbons boiling above the gasoline boiling range, separated or fractionated from said high antiknock gasoline are commingled with the hydrocarbon oil, hydrogen and catalyst mixture and subjected to said catalytic processing for the production of additional yields of gasoline of high antiknock value.

According to the present invention, hydrocarbon oil fractions, more generally those of a distillate character which do not deposit excessive amounts of hydrocarbonaceous deposits upon the catalyst, are catalytically treated in the presence of hydrous oxide catalysts containing cracking and hydrogenating components which have been precipitated in a very finely divided form and then maintained in a fine state of division for processing with the hydrocarbon oil. The hydrous oxides employed are preferably composites of hydrated silica, alumina and/or zirconia with a hydrogenation catalyst, hydrated silicon dioxide constituting the major proportion of the catalyst composition while the remaining components are preferably present in minor proportions. The catalyst is prepared in a finely divided rather than in the usual gel condition, preferably by precipitating initially a hydrated silica under definitely controlled conditions in the presence of a suitable added substance. A relatively highly dispersed precipitate nearly of colloidal dimensions is thus produced which is composited with the remaining components and yields a catalyst which is more effective in the present process than catalysts of corresponding composition prepared from gels or gelatinous precipitates.

In the preparation of the finely divided precipitates the various substances which may be present in the solution to effect the desired precipitation may be of a number of different types which however are not equivalent in the effects produced, nor in the concentration and manner in which they are used. Although all alkali metals do not necessarily function in the desired manner, it may be stated that a number of the salts with both weak and strong acids exhibit the desired precipitation effect. In the preparation of hydrated silica from water-glass solutions by the addition of hydrochloric acid for example, the proper addition of sodium chloride gives a precipitated catalyst of the desired character. The anions of alkali metal and/or ammonium salts which may be used may constitute the halides, the sulfates, the nitrates, the carbonates, the phosphates, and the acetates, the citrates, oxalates, or other organic acid ions. Organic substances or compounds may also be added under selected conditons either in addition to, or in some specific cases, separately from the inorganic or mixed salts. Thus, miscible solvents may be added such as alcohols, ketones, or other organic substances.

Various methods may be employed in compositing the hydrous oxides and hydrogenating components used in the catalytic processing according to the present invention depending upon the particular use and the extent to which the catalyst is employed. According to one general method, a finely divided hydrated silica may be prepared by diluting an alkali metal silicate such as a commercial grade of waterglass with approximately 3 to 10 times its volume of a solution wherein an added amount of substance giving rise to the formation of finely divided hydrated silica is disposed in the proper concentration prior to the precipitation of the finely divided siliceous material. According to this method as a specific example, a definite amount of sodium chloride may be used for a particular dilution and kind of waterglass employed, and acid gradually added while thoroughly agitating, in an amount sufficient to produce the finely divided hydrated silica. It is necessary, even where the proper amount of the added substance is present, to thoroughly mix the reactants in streams or by agitation, and to employ times of 5 to 20 minutes or more depending upon the size of batch, mixing conditions, etc. As a specific example of compositing the catalytic material, the finely divided hydrated silica prepared in this manner may be admixed while still in suspension with a solution of salts of the metals for which hydrated oxides are to be precipitated in the presence of finely divided hydrated silica, and an alkaline precipitant added to precipitate the hydrous oxides. The primary hydrated silica may, however, be filtered and separated from the salt solution which is present, further washed and purified if desired, and may then be composited with the remaining components. Thus, a finely divided hydrated silica may be precipitated, filtered and washed to remove alkali metal impurities by methods which will be subsequently described, and the purified hydrated silica then dispersed in a solution containing aluminum chloride and molybdenum oxychloride, for example, and hydrated alumina and hydrated molybdena precipitated in the presence of the finely divided hydrated silica by the addition of ammonium hydroxide.

According to another procedure, a solution of a soluble silicon compound may be mixed with a solution of the metal compounds for which the corresponding hydrous oxides are to be coprecipitated with hydrated silica, while also mixing in the added substance to promote formation of the finely divided precipitate. The hydrogen ion concentration of the reactants or reaction mixture is adjusted depending in large measure upon the proportions and character of the reactants and of the added substance. In this case also the very finely divided precipitate may be formed as a fine suspension distributed through the liquid if proper conditions of concentration, mixing dilution and pH conditions are observed. Various coprecipitation procedures are possible depending for example upon whether silicates are used or silicon salts.

In the composites of the catalytic components, approximately 5 to 35 per cent or more of the hydrated oxides are preferably composited with the hydrated silicon dioxide. Proportions outside of this range may, however, be utilized, but generally speaking, without the same catalytic effectiveness. Thus, a few mols of hydrated molybdena may for example be composited with 5 to 10 mols of hydrated alumina and/or zirconia and with 100 mols of the specially precipitated silicon dioxide. The precipitates or composites are filtered in any convenient form of filtration apparatus and the filter cake may be thoroughly washed free from impurities if it is desired to produce the catalyst in a highly active and stable form so as to permit repeated use and regeneration thereof. This treatment which consists particularly in the removal of alkali metal impurities may be accomplished by a thorough washing with various acidic and salt solutions. Water acidulated with strong acids, for example, or solutions of strong salts of ammonium or of metals corresponding to those of the added metal oxides for example, may be suitable. The catalyst material may in general be purified before or after drying treatment but the purification washes are preferably carried out as has been illustrated upon the specially prepared hydrated silica prior to compositing with the remaining hydrated oxides. The composited material is finally dried at a temperature of approximately 200–300° F.

In the above described procedures hydrated molybdena has been used to illustrate a hydrogenation catalyst. Other hydrogenation catalysts may also be employed such as oxides and sulphides of nickel, copper and chromium.

The finely divided powder prepared according to the above procedures may have a particle size of the order of 1 to 10 microns and is particularly suitable for admixing with the hydrocarbon oil according to the present process in the conversion and refining thereof in the presence of hydrogen to produce large yields of relatively saturated high antiknock gasoline. The kind of powdered catalyst used is not restricted to any single preparation procedure since various types of hydro-cracking hydroforming, hydrorefining and desulfurization operations may be carried out in the presence of the catalyst powder. The catalyst is preferably prepared in the highly stable purified form so that it may be repeatedly used and freed from residual and carbonaceous deposits by regeneration with oxidizing gases. In this type of operation, powdered catalyst may be separated from the conversion products by various separating procedures. The separated spent catalyst is then regenerated by removing hydrocarbonaceous deposits by preliminary solvent treatment and/or heating in the presence of air to oxidize the carbonaceous material whereupon the catalyst is again used either alone or in admixture with fresh catalyst in suspension in the hydrocarbon oil undergoing treatment.

Various types of hydrocarbon conversion reactions may take place in the presence of the powdered catalyst depending partly upon the temperature, pressure and time conditions and partly upon the type of hydrocarbon oil processed. In addition to hydrogenating reactions, these reactions may include carbon-to-carbon cleavage, isomerization, cyclization, and desulfurization reactions. In the case of higher boiling hydrocarbons for example there may be a cleavage of long carbon-to-carbon chains and isomerization reactions may also occur wherein the lower boiling hydrocarbons formed tend to become more highly branched. Also hydro-aromatic hydrocarbons present in the oil undergoing decomposition or formed therein by cyclization of olefins may form aromatic hydrocarbons. Hydrogen in the presence of hydrogenating catalysts reacts with unsaturated hydrocarbons to form more saturated hydrocarbons. Highly saturated hydrocarbons are formed at the lower temperatures given in the range of operating conditions and products having a lower degree of saturation are formed at the higher temperatures employed. The hydrocarbons generally are of a more branched chain structure than are produced in thermal cracking treatment. The temperatures employed may be within the approximate range of 700-1150° F., more or less, and the pressures employed may range from approximately atmospheric to 1000 pounds or more per square inch.

The following specific example is given to illustrate a specific application of the process of the invention, the method of catalyst preparation also being indicated. The invention should not be considered as limited to these examples of the process or to the particular catalyst preparation since these are given as illustrations of the novelty and utility of the invention.

A silica-alumina-molybdena catalyst powder having a composition of approximately

$100SiO_2 : 5Al_2O_3 : 2MoO_3$ may be prepared according to the following procedures:

A commercial sample of water glass of approximately 41° Baumé gravity and containing approximately 28.5 per cent $SiO_2$ and 8.9 per cent $Na_2O$ is diluted approximately 10 times with water containing dissolved sodium chloride in an amount equal to approximately ½ of the weight of the water glass. Hydrochloric acid is added to the water glass-sodium chloride solution while agitating thoroughly and a very finely divided precipitate begins to form and remains in suspension in the alkaline solution. The addition of acid is continued until there is an excess of acid, the pH being approximately 3. The excess acid may then be substantially neutralized by the addition of ammonium hydroxide whereupon hydrated silica is practically all precipitated. The finely divided precipitate of hydrated silica is filtered and washed with acidulated water to substantially remove alkali metal impurities as indicated by the magnesium uranyl acetate test. The purified hydrated silica is then suspended in a dilute solution of aluminum chloride and molybdenum oxychloride in amounts according to the above composition, and hydrated alumina and hydrated molybdena precipitated in the presence of the finely divided hydrated silica by the addition of ammonium hydroxide. The composite precipitate is filtered and water washed and the filter cake is dried at a temperature of approximately 200-250° F. This catalyst has a particle size of approximately 2½ to 5 microns and is several times as effective on a weight basis as catalyst powder produced by pulverizing corresponding materials prepared in the gel condition.

When catalyst as above prepared is mixed with a 37° A. P. I. Pennsylvania gas oil to the extent of approximately one percent by weight and is then processed in the presence of approximately three mols of hydrogen per average mol of hydrocarbon oil charged at an average temperature of approximately 860° F. in the reaction chamber and a pressure of approximately 300 pounds per square inch, a yield of approximately 26 per cent of 400° F. end-point gasoline may be obtained having an octane number of 80 by the A. S. T. M. motor method and a bromine number of approximately 30.

I claim as my invention:

1. A process for the catalytic conversion of a hydrocarbon oil to produce relatively saturated high antiknock gasoline which comprises subjecting said hydrocarbon oil at a temperature of from about 700 to about 1150° F. and at a pressure of from approximately atmospheric to about 1000 pounds per square inch in the presence of hydrogen to contact with a finely divided catalyst comprising silica, a hydrated metal oxide having cracking properties in combination with the hydrated silica, and a metal compound having hydrogenation properties, the silica having been precipitated as a non-gelatinous finely divided hydrate by acidification of a solution containing a soluble silicate and a soluble alkali metal salt.

2. A process for the destructive hydrogenation of a hydrocarbon oil to produce a relatively saturated high antiknock gasoline which comprises subjecting the hydrocarbon oil in a commingled state with hydrogen to contact with a finely divided catalyst prepared by commingling hydrated silica with a hydrated alumina and a hydrated molybdena, the silica having been precipitated as a non-gelatinous finely divided hydrate by acidification of a solution containing a soluble silicate and a soluble alkali metal salt.

3. A process for the catalytic conversion of a hydrocarbon oil to produce a relatively saturated high antiknock gasoline which comprises subjecting said hydrocarbon oil in the presence of hydrogen to contact with a finely divided catalyst prepared by precipitating finely divided hydrated silica from an alkali metal silicate solution by acidification thereof in the presence of an added sodium salt, suspending said finely divided hydrated silica in a solution of an aluminum salt and a molybdenum salt, and precipitating hydrated alumina and hydrated molybdena in the presence of said finely divided hydrated silica.

4. A process for the catalytic conversion of a hydrocarbon oil to produce a relatively saturated high antiknock gasoline which comprises subjecting said hydrocarbon oil in the presence of hydrogen to contact with a finely divided catalyst prepared by precipitating finely divided hydrated silica from an alkali metal silicate solution by acidification thereof in the presence of an added sodium salt, purifying the said finely divided precipitated hydrated silica to substantially remove alkali metal impurities, suspending the purified hydrated silica in a solution of an aluminum salt and a molybdenum salt and precipitating hydrated alumina and hydrated molybdena in the presence of said hydrated silica by the addition of ammonium hydroxide.

5. A conversion process which comprises subjecting hydrocarbon oil to catalytic cracking conditions in the presence of hydrogen and a powdery mixture of silica, alumina and molybdena, the silica having been precipitated as a non-gelatinous finely divided hydrate by acidification of a solution containing a soluble silicate and a soluble alkali metal salt.

6. A conversion process which comprises subjecting hydrocarbon oil to catalytic cracking conditions in the presence of hydrogen and a catalyst in powdery form comprising silica and a precipitated metal oxide having hydrogenating properties, the silica having been precipitated as a non-gelatinous finely divided hydrate by acidification of a solution containing a soluble silicate and a soluble alkali metal salt.

7. The process of claim 6 further characterized in that said precipitated metal oxide comprises molybdena.

8. The process of claim 6 further characterized in that said catalyst contains alumina.

9. The process of claim 6 further characterized in that said catalyst contains zirconia.

10. A conversion process which comprises subjecting hydrocarbon oil to catalytic cracking conditions in the presence of hydrogen and a catalyst in powdery form comprising silica, a precipitated activating oxide having cracking properties and a precipitated activating oxide having hydrogenating properties, the silica having been precipitated as a non-gelatinous finely divided hydrate by acidification of a solution containing a soluble silicate and a soluble alkali metal salt.

11. A conversion process which comprises subjecting hydrocarbon oil to conversion conditions in the presence of hydrogen and a catalyst in powdery form comprising silica and a precipitated activating oxide having hydrogenating properties, the silica having been precipitated as a nongelatinous finely divided hydrate by acidification of a solution containing a soluble silicate and a soluble alkali metal salt.

12. The process of claim 11 further characterized in that the catalyst contains alumina.

13. The process of claim 11 further characterized in that the catalyst contains zirconia.

14. The process of claim 11 further characterized in that said activating oxide comprises molybdena.

15. A conversion process which comprises subjecting hydrocarbon oil under conversion conditions and in the presence of hydrogen to contact with a catalyst in powdery form comprising silica and a precipitated activating oxide having hydrogenating properties, the silica having been precipitated as a non-gelatinous finely divided hydrate by acidification of a solution containing a soluble silicate and a soluble alkali metal salt and the precipitated silica purified to substantially remove alkali metal impurities.

16. A conversion process which comprises subjecting hydrocarbon oil under conversion conditions and in the presence of hydrogen to contact with a catalyst in powdery form comprising silica, precipitated zirconia and precipitated molybdena, the silica having been precipitated as a non-gelatinous finely divided hydrate by acidification of a solution containing a soluble silicate and a soluble alkali metal salt and the precipitated silica purified to substantially remove alkali metal impurities.

17. A conversion process which comprises subjecting hydrocarbon oil under conversion conditions and in the presence of hydrogen to contact with a catalyst in powdery form comprising silica, precipitated alumina and precipitated molybdena, the silica having been precipitated as a non-gelatinous finely divided hydrate by acidification of a solution containing a soluble silicate and a soluble alkali metal salt and the precipitated silica purified to substantially remove alkali metal impurities.

ELMER R. KANHOFER.